Patented July 18, 1939

2,166,221

UNITED STATES PATENT OFFICE 2,166,221

PROCESS FOR PRODUCING PIGMENT TITANATES

Gordon D. Patterson, Wilmington, Del., assignor to E. I. du Pont de Nemours & Company, Wilmington, Del., a corporation of Delaware No Drawing. Application June 29, 1937, Serial No. 150,966

12 Claims. (Cl. 23—51)

This invention relates to a process for producing titanates, and more particularly to the production of water-insoluble titanates suitable for use as pigments.

Metal titanates can be prepared by calcining mixtures of a titanium compound with the oxygen compounds of other metals. In known processes, however, high temperatures, in the vicinity of the fusion point of the reactants, must be employed to cause the reaction to go to substantial completion. High temperatures, particularly those of the order at which sintering or melting of the reacting components occurs, induce undesirable grit formation, rendering the resultant titanate unsuitable for pigmentary purposes. Titanate production through employment of relatively low reaction temperatures and at which no sintering or fusion components occurs, is of essential importance in high-quality pigment-titanate production.

In an attempt to obviate the necessity of high temperature employment, the use of chloride catalysts has been suggested for titanate production. However, this type of catalyst is of such nature that it detrimentally affects the pigmentary properties, such as texture and color, of the titanate produced. In addition, chloride catalyst use necessitates resort to very narrow and undesirably close control over calcination temperatures, in order to obtain a salable product and to avoid the bad effects arising by reason of over or under-treatment, or of incomplete reaction. In addition, the resultant product will contain a relatively large amount of water-soluble materials, i. e., of the order of 0.5% or more, such as soluble salts, including some 0.15% or more of combined chlorine. These water-soluble materials in the pigment are undesirable because of their relation to stability characteristics of the titanate when used in coating compositions. An added disadvantage of chloride catalyst presence during calcination is the fact that the titanate particles become cemented together as relatively large agglomerates, the latter making their appearance in the finished product in the form of deleterious grit. A further objection to chloride catalyst use is corrosion of equipment.

I have found that these as well as other difficulties in prior titanate pigment production may be effectively overcome. Accordingly, it is among the objects of my invention to provide a process affording greater latitude of control over the involved reaction, the use of lower and wider range reaction temperatures, and avoidance of the necessity of resort to chloride catalysts use. Other and further objects and advantages of the invention will become apparent as the ensuing description proceeds.

In its broadest adaptation, the invention contemplates producing a substantially water-insoluble titanate pigment by reacting, under elevated temperature conditions and in the presence of water vapor or steam, titanium oxide with a basic metal compound, whereby the substantially insoluble titanate pigment is formed and the reaction proceeds at a temperature very much below that at which the reacting components would otherwise react were not the steam present. Various forms of hydrated or dehydrated titanium oxide may be used.

In a more specific and preferred embodiment, the invention comprises calcining an intimate mixture of an oxygen compound of titanium, such as a hydrated oxide obtained by the hydrolysis of a titanium sulfate or other salt solution, and another oxygen-metal compound, such as barium carbonate, at a temperature not to exceed substantially 1050° C. and preferably within a range of from about 700° C. to about 975° C. in the presence of steam. Hydrated titanium oxides prepared by hydrolysis of titanium salt solutions contain varying minor amounts of firmly held or combined acid which is preferably removed by neutralization and washing.

In one practical embodiment of my invention, I first prepare for calcination an intimate mixture of titanium oxide and barium carbonate by any conventional method, such as dry mixing, dry disintegration, mixing in the form of a water slurry, ball milling, colloid milling, etc. Preferably, I ball mill a water slurry of the two components. I then remove the water from the ball mill slurry and subject the resultant mixture to calcination at a temperature ranging from about 750° C. to about 975° C. in the presence of steam and for a time period sufficient to cause the reaction to go to substantial completion. The resultant product, i. e., barium titanate, exhibits highly improved pigmentary properties, including excellent tinting strength, color and texture, and contains relatively low and minor amounts of water-soluble material (less than 0.2%), while the chlorine content thereof is practically nil, representing only such impurities as may be present in the raw material, amounting not to exceed about 0.05% calculated as chlorine.

In order that the invention may be more clearly understood, the following specific example is given, which is merely illustrative in character, and in no wise in limitation of the underlying concepts of my invention:

A hydrated titanium dioxide was prepared by the hydrolysis of a titanium sulfate solution, followed by removal of residual sulfuric acid by neutralization and washing. An amount of this hydrate corresponding to 100 parts $TiO_2$ and 246 parts by weight of barium carbonate (1:1 molecular proportion) was ball-milled in a water slurry and filtered out. The intimate mixture obtained was then calcined for one hour at 950° C. in a suitable calciner, steam being admitted at such rate as to maintain an atmosphere of nearly 100% water vapor in the calciner.

The resulting barium titanate was a finely-divided, white powder of good color and brightness, possessing a tinting strength of 208, an increase of about 10% over a tinting strength of 188 in a barium titanate made with a chloride catalyst under the same conditions; its texture was equal to that of a commercial, finely-ground lithopone.

The above example illustrates a general method for the synthesis of metal titanates and demonstrates the advantages which are obtained by my novel process. The process is equally applicable to the preparation of other white titanate pigments of metals of the second group of the periodic arrangement of the elements, such as those of magnesium, calcium, strontium, zinc and cadmium, and particularly to alkaline earth metal titanates, and to preparation of mixed titanates in which two or more metal oxides are combined with titanium oxide.

It is not intended to limit the process to the preparation of white titanates as similar advantages of substantially complete reaction and increased tinctorial power are possible in the preparation of tinted or colored pigments comprising the titanates of metals such as lead, manganese, iron, cobalt, nickel, etc. A wide range of tints and colors is also possible by preparing mixed titanates in which the basic oxides combined with titanium oxide consist of a mixture of metal oxides one of which forms a white titanate and the other a colored titanate. Furthermore, the process is also applicable to preparations in which another acidic oxide may replace a portion of the titanium oxide in the composition.

The tinting strength, color and texture determinations set forth in the preceding example were determined in accordance with methods commonly used for pigment testing. The method for tinting strength determination which was used is found described in "Physical and Chemical Examination of Paints, Varnishes, Lacquers and Colors", eighth edition, January 1, 1937, by Henry A. Gardner, pages 83, 84 and 85, under the heading "Tinting Strength of White Pigments—Du Pont Method." The texture test used is essentially the same as that described on pages 511 and 512 of the same reference and designated, "Krebs Texture Test for Pigments." In these tests gradings are made against a series of arbitrary standards in which a minimum of 1 point represents a significant difference. In tinting strength ratings, the higher the numerical value, the higher the tinctorial power of the pigment and for texture the higher the numerical value, the finer the texture. Color gradings were made by directly comparing the colors of oil pastes of the pigments in question.

As will be seen, the tinting strength of titanates produced in accordance with my novel process is considerably greater than that of titanates obtained in chloride-catalyzed reactions. This improvement in tinting strength is illustrated by the following comparative table, involving barium titanate per se and produced by reacting titanium oxide with barium carbonate:

TABLE I

*Effect of steam on calcination of barium titanate tinting strength*

| Calcination temperature | No catalyst | Chloride catalyst | Steam |
|---|---|---|---|
| 750° C | 102 | 127 | 163 |
| 950° C | 162 | 188 | 208 |
| 1030° C |  | 127 |  |
| 1050° C | 180 |  | 215 |

An additional beneficial effect which steam employment exerts in my invention is that with respect to effecting substantial completion of the reaction. In a typical barium titanate pigment preparation, such as illustrated in the above example, the unreacted barium content expressed as barium oxide, was 0.6%, whereas a comparable product made using a chloride catalyst in the absence of steam contained 2.5% unreacted barium oxide.

A further desirable and beneficial effect accruing as a result of steam employment in my invention is that concerning the highly improved texture of the titanate product obtained. The following comparative table illustrates this outstanding feature of my invention:

TABLE II

*Texture of barium titanate (untreated after calcination)*

| Calcination temperature | Chloride catalyst | Steam |
|---|---|---|
| 850° C | 8+ | 12 |
| 950° C | 9 | 10 |
| 1000° C |  | 9+ |
| 1030° C | 4 |  |
| 1050° C |  | 9+ |

Gradings were made against a series of standards. A minimum of one point is a significant difference. The higher the numerical value, the finer the texture.

The fact that optimum texture is obtainable over a wide range of temperatures by steam calcination in comparison with the more limited temperature range for other methods is obviously of considerable advantage, because it permits greater latitude in control of operations. Inasmuch as commercial success of pigments depends on cost, as well as pigment properties, texture fine enough to avoid the necessity of additional grinding is important.

The effect which the use of steam has upon reduction of the water-soluble content of titanate pigments prepared in accordance with my invention, as well as on chlorine content is shown by the following table:

TABLE III

*Water-soluble and chlorine content of barium titanates untreated after calcination*

| Calcination temperature | Water-soluble content, percent | | Chloride content (as chlorine) percent | |
|---|---|---|---|---|
| | Chloride catalyst | Steam | Chloride catalyst | Steam |
| 830° C | | 0.11 | | 0.026 |
| 850° C | 1.38 | | 0.46 | |
| 950° C | 1.00 | | 0.17 | |
| 1050° C | | 0.12 | | 0.007 |
| British commercial sample | 0.39 | | 0.15 | |

Thus, it will be seen that my invention provides for the production of relatively pure and improved titanate pigments, the components of which are more completely reacted, at lower calcination temperatures. Additionally, the titanates obtainable exhibit improved pigment properties, particularly in regard to tinting strength, texture, and color, and have improved paint properties due to reduction in water-soluble content, i. e., to below 0.2% by weight, as well as reduction of water-soluble chloride content, i. e., to below 0.05% by weight (calculated as chlorine). Salts such as barium chloride, which are necessary during ordinary catalytic calcination, but eliminated by my invention, act as fritting agents, tending to bond the particles together and form large undesirable aggregates which induce undesirable grit formation in the ultimate pigment. Consequently, in contrast to titanates made at higher temperatures or in the presence of chlorine catalysts, my novel pigments are of fine, uniform particle size, of excellent texture, free from grit, and, without further processing, are suitable for many purposes.

While specific reaction temperatures have been exemplified, it will be understood that the temperatures employable will largely depend upon the chemical nature of the metal to be combined with the titanium in making up the ultimate titanate. In some instances, the use of a temperature as low as 450° C. in the presence of steam will be found sufficient. In other instances, such as in the formation of alkaline earth metal titanates, temperatures of the order of substantially 800–900° C. and the use of steam will usually suffice, though in the absence of steam, much higher temperatures will be required to insure the same degree of completion of titanate formation. In the production of my novel titanates, however, I prefer to insure a high quality both of texture and tinting strength by maintaining a reaction temperature not in excess of about 1050° C., and preferably below about 975° C., in the presence of steam. Pigments obtained at such low temperatures possess decided advantages in respect to physical form over titanates obtained by employment of substantially higher temperatures. When temperatures above about 1000° C. are employed, undesirable effects upon the physical characteristics of the titanate, such as tinting strength, color, texture, etc., begin to appear, while above about 1050° C. these adverse effects become somewhat pronounced. Accordingly, in the preferred adaptation of my invention, temperatures below 975° C. are employed, in order that a product of optimum pigment properties may be obtained.

In the practice of my invention, I preferably employ an atmosphere consisting of straight steam. However, the amount of steam so employed is subject to variance within relatively wide limits. Very good results are obtained with an atmosphere containing 50% by volume of steam. The effects and benefits of steam use are evident even when an amount as low as 25% by volume is employed, but for optimum benefits under the invention I prefer to use higher percentages. In the practical adaptation of my invention, however, the presence of as little as 10% by volume of steam appears to exert no significant advantage over calcination in the absence of steam.

While specific titanates have been exemplified, the invention has general application to the production of all types of substantially water-insoluble titanate pigments, including mixed titanates. By "titanate pigments" I refer to a finely-divided solid having pigment properties, comprising one or more metal titanates and containing not less than 10 per cent by weight of chemically combined titanium oxide. Specifically, the term "titanate" or "metal titanate", here and in the appended claims, embraces any salt of titanic acid such as a meta titanate or an ortho titanate, or mixtures of such salts, and has particular reference to simple titanates comprising a chemical combination of an oxide of titanium and an oxide of a metal other than titanium, as well as to mixed metal titanates comprising a chemical combination of an oxide of titanium with the oxides of two or more metals other than titanium. These titanates are obtained by reacting in an atmosphere of steam intimate mixtures of acidic and basic oxides, i. e., an oxygen compound of titanium with an oxygen-metal compound other than titanium, such as an oxide or any other compound or substance adapted to yield an oxide during the reaction, such as a carbonate, hydroxide, or peroxide. Preferably, the acidic oxide includes not less than about 25% molar equivalent of titanium oxide and not more than about 10% molar equivalent of an oxide which produces a water-soluble pigmenting component on calcination. Normally it is preferable to keep the water-soluble pigmenting component below 10% by weight of the total pigment.

It will be seen that titanate production from alkaline earth metals, which produce white titanates, as well as from the heavy metals which form more or less colored titanates, is contemplated. When the alkaline earth oxygen-metal compounds are employed, it will be found that my process yields titanates which are highly improved in whiteness and better and superior in this respect than titanates prepared by known processes, those prepared by my process being on the blue rather than on the yellow side. This, of course, is a very desirable property in a white pigment. In particular, production of titanates containing one or more of the following metals is thus contemplated, namely, magnesium, calcium, strontium, barium, zinc, cadmium, lead, manganese, iron, cobalt and nickel. The oxides of these metals may be employed in the reaction with the oxygen compound of titanium, or other compounds of such metals, including the hydroxides, carbonates, or peroxides, or any salt of these metals adapted to decompose into the reactive metal oxide in the process of titanate formation in the presence of water vapor or steam. These may be individually combined with a titanium oxide to form a simple titanate, or two or more of the oxides of these metals may be jointly heated with titanium in the presence of steam to form mixed titanate pigments. Accordingly, the term "oxygen-metal compound", here and in the appended claims, includes metal compounds which are capable of forming reactive oxides by thermal decomposition in the process of titanate formation, such as, for example, oxides, carbonates, hydroxides, or peroxides of the metals mentioned.

I claim as my invention:

1. A process for producing substantially chlorine-free, water-insoluble titanate pigments comprising reacting under elevated temperature conditions an acidic titanium oxide with a basic oxygen-metal compound from the group consisting of oxides, carbonates, hydroxides and peroxides, while maintaining the reactants at a temperature of at least 450° C. and not to exceed 1050° C. and in an atmosphere of at least 25% by volume of steam.

2. A process for producing substantially chlorine-free insoluble metal titanates comprising calcining an intimate mixture of titanium oxide with an oxygen-metal compound from the group consisting of oxides, carbonates, hydroxides and peroxides, while maintaining the reactants at a temperature ranging from substantially 700–975° C. and in an atmosphere of at least 25% by volume of steam.

3. A process for producing a chlorine-free, water-insoluble titanate pigment comprising subjecting an intimate mixture of a titanium oxide and an oxygen-metal compound selected from the group consisting of oxides, carbonates, hydroxides and peroxides to calcination at a temperature of at least 450° C. and not exceeding 1050° C. and in an atmosphere of at least 25% by volume of steam.

4. The process of claim 3 in which the calcination is carried out at a temperature below the sintering point of the reaction mixture.

5. A process for producing a substantially chlorine-free pigment titanate comprising heating to a temperature between substantially 750 and 975° C. an intimate mixture of titanium dioxide and a carbonate of a metal from the group consisting of magnesium and the alkaline earth metals, and conducting said reaction in an atmosphere of at least 25% by volume of steam.

6. A process for producing substantially chlorine-free pigment barium titanates, comprising heating an intimate mixture of titanium dioxide and barium carbonate in equimolecular proportions to a temperature of about 950° C., while maintaining said reactants during said heating in an atmosphere of at least 25% by volume of steam.

7. A process for producing a substantially chlorine-free, water-insoluble titanate pigment, comprising reacting at an elevated calcination temperature not to exceed 1050° C., and in a substantial atmosphere of at least 25% by volume of water vapor, an intimate mixture of an oxide of titanium with an oxygen-metal compound from the group consisting of oxides, carbonates, hydroxides and peroxides.

8. A process for producing a substantially chlorine-free, water-insoluble titanate pigment, comprising reacting at a temperature ranging from 750 to 975° C., and in an atmosphere containing at least 25% water vapor by volume, an intimate mixture of an oxide of titanium with an oxygen-metal compound from the group consisting of oxides, carbonates, hydroxides and peroxides.

9. A process for producing a substantially chlorine-free, water-insoluble titanate pigment, comprising reacting at an elevated calcination temperature not to exceed 1050° C., and in an atmosphere containing at least 50% of water vapor by volume, an intimate mixture of an oxide of titanium with an oxygen-metal compound from the group consisting of oxides, carbonates, hydroxides and peroxides.

10. A process for producing a chlorine-free, water-insoluble titanate pigment, comprising reacting an intimate mixture of an oxide of titanium with an oxygen-metal compound from the group consisting of oxides, carbonates, hydroxides and peroxides, while maintaining the reactants at a temperature of at least 450° C. and not in excess of 1050° C., and in an atmosphere of at least 25% by volume of steam.

11. A process for producing a substantially chlorine-free, water-insoluble pigment titanate, comprising subjecting an intimate mixture of titanium oxide and the oxide of a metal, the titanate of which is water-insoluble, to calcination in at atmosphere of at least 25% by volume of steam, and at a temperature of at least 450° C. and not exceeding 1050° C.

12. A process for producing a substantially chlorine-free, water-insoluble pigment titanate, comprising heating to a temperature between substantially 750 and 950° C. an intimate mixture of titanium oxide and an alkaline earth oxygen-metal compound from the group consisting of oxides, carbonates, hydroxides and peroxides, while maintaining the reactants in an atmosphere of at least 25% by volume of steam.

GORDON D. PATTERSON.